US008533920B2

(12) United States Patent
Igarashi

(10) Patent No.: US 8,533,920 B2
(45) Date of Patent: *Sep. 17, 2013

(54) METHOD AND APPARATUS FOR MANAGING A NETWORK, NETWORK MANAGEMENT PROGRAM, AND STORAGE MEDIUM INCLUDING A NETWORK MANAGEMENT PROGRAM STORED THEREON

(75) Inventor: Toshiaki Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1654 days.

This patent is subject to a terminal disclaimer.

(21) Appl. No.: 11/133,188

(22) Filed: May 20, 2005

(65) Prior Publication Data

US 2005/0235344 A1 Oct. 20, 2005

Related U.S. Application Data

(62) Division of application No. 09/866,668, filed on May 30, 2001, now Pat. No. 6,920,568.

(30) Foreign Application Priority Data

May 30, 2000 (JP) .............................. 160202/2000

(51) Int. Cl.
*G06F 7/04* (2006.01)
(52) U.S. Cl.
USPC ..................................................... 26/6; 726/2
(58) Field of Classification Search
None
See application file for complete search history.

(56) References Cited

U.S. PATENT DOCUMENTS

| 4,589,081 | A | * | 5/1986 | Massa et al. ................... 702/185 |
| 5,220,674 | A | * | 6/1993 | Morgan et al. ................. 709/223 |
| 5,402,492 | A | * | 3/1995 | Goodman et al. ............. 713/202 |
| 5,720,015 | A | * | 2/1998 | Martin et al. .................. 358/1.15 |
| 6,182,225 | B1 | * | 1/2001 | Hagiuda et al. ............... 713/201 |

FOREIGN PATENT DOCUMENTS

JP 2000231466 A 8/2000

OTHER PUBLICATIONS

User Manual for N1153-L4050 MltiWriter 4050, "How to use Printer Software," Japan, NEC, Jun. 1999, p. 20-p. 22 and p. 109-p. 110.

* cited by examiner

*Primary Examiner* — Peter Poltorak
(74) *Attorney, Agent, or Firm* — Fitzpatrick, Cella, Harper & Scinto

(57) ABSTRACT

A method, apparatus, program, and storage medium, for managing a network device by communicating with an information processing device and the network device via a network and managing the network device in response to a request from the information processing device. If a request for execution of a process, which needs particular authorization, upon the network device, is received from the information processing device, it is determined whether a command to invalidate a password of said network device has been received together with the process execution request. When the password of the network device is to be invalidated, a password invalidation request is transmitted to the network device. This technique makes it possible for an administrator of a network device to use it even when the administrator forgets the device password assigned to the network device without having to perform initialization which would cause all setting data to be lost.

15 Claims, 15 Drawing Sheets

FIG. 14

| |
|---|
| PROGRAM CODE CORRESPONDING TO THE DEVICE LIST MODULE |
| PROGRAM CODE CORRESPONDING TO THE GLOBAL CONTROL MODULE |
| PROGRAM CODE CORRESPONDING TO THE CONFIGURATOR MODULE |
| PROGRAM CODE CORRESPONDING TO THE SEARCH MODULE |
| PROGRAM CODE CORRESPONDING TO THE NetWare MODULE |
| PROGRAM CODE CORRESPONDING TO THE UI (A) MODULE |
| PROGRAM CODE CORRESPONDING TO THE UI (B) MODULE |
| PROGRAM CODE CORRESPONDING TO THE CONTROL (A) MODULE |
| PROGRAM CODE CORRESPONDING TO THE CONTROL (B) MODULE |
| PROGRAM CODE CORRESPONDING TO THE MIB MODULE |
| PROGRAM CODE CORRESPONDING TO THE SNMP MODULE |
| PROGRAM CODE CORRESPONDING TO THE IPX HANDLER MODULE |
| PROGRAM CODE CORRESPONDING TO THE UDP HANDLER MODULE |
| PROGRAM CODE CORRESPONDING TO THE PROCESS SHOWN IN FIG. 7 |
| PROGRAM CODE CORRESPONDING TO THE PROCESS SHOWN IN FIG. 8 |
| PROGRAM CODE CORRESPONDING TO THE PROCESS SHOWN IN FIG. 9 |
| PROGRAM CODE CORRESPONDING TO THE PROCESS SHOWN IN FIG. 10 |

METHOD AND APPARATUS FOR MANAGING A NETWORK, NETWORK MANAGEMENT PROGRAM, AND STORAGE MEDIUM INCLUDING A NETWORK MANAGEMENT PROGRAM STORED THEREON

RELATED APPLICATION

This application is a divisional of application Ser. No. 09/866,668, filed May 30, 2001, the entire disclosure of which is hereby incorporated by reference.

BACKGROUND OF THE INVENTION

1. Field of the Invention

The present invention relates to a computer network, and more particularly to a network device management device on which network management software is running to manage a network device such as a printer (printing device), a copying machine, a scanner, and a multi-purpose device, connected to a network. The present invention also relates to a method and a program for managing such a network device.

2. Description of the Related Art

In recent years, local area networks (LANs) have been more and more widely used to connect computers to one another. A local area network is built over an entire floor or an entire building, or across a plurality of buildings, and thus involves either a small or a large area. A large number of local area networks are built at various locations, and some of them are connected to a worldwide network. In respective LANs connected to one another, various different techniques are used to connect hardware devices to one another, and various network protocols are used.

In the case of a small isolated LAN system, the user of that LAN system can manage his/her own devices. That is, the user can replace a device, install software, and diagnose any problems.

However, in the case of a large scale LAN system or a group of LAN systems connected to one another, systematic "management" is needed. In general, the term "management" is used to describe both management performed by a human network administrator and management performed by software under the control of the human administrator. In describing the present invention herein, the term "management" may encompass "management" over an entire system performed by software, and the term "user" is to describe a human user who uses network management software, can acquire management data via a network using-network management software, and can modify the management data. The "user" is usually a system administrator.

Large scale network systems are usually dynamic systems in which it is needed frequently to perform extension and removal of devices, updating of software, and detection of problems. Various large scale network systems provided by various manufacturers are used by various users in various manners. Efforts are being made by various organizations to establish standards of techniques of managing network devices connected to one another via networks in large scale network systems. The International Organization for Standardization (ISO) has proposed a general-purpose reference framework called the Open System Interconnection (OSI) model. The network management protocol according to the OSI model is called the Common Management Information Protocol (CMIP). This protocol is employed in Europe as a common network management protocol.

In recent years, a more versatile network management protocol called the Simple Network Management Protocol (SNMP) has been proposed. This protocol is a modification of CMIP (explanation thereof may be found, for example, in "An Introduction to Management of TCP/IP-Based Internets" (Marshall T. Rose, Prentice Hall; a Japanese version translated by Takeshi Nishida is also available).

A network management system according to this SNMP network management technique includes at least one network management station (NMS), nodes which are managed by the network management station and each of which includes an agent, and a network management protocol used to transmit management information between the management station and the agents. A user can acquire network management data and modify it by communicating with agent software at managed nodes using network management software on the NMS.

Herein, the term "agent" refers to software which is executed as a background process at the respective managed nodes. When the user requests a managed node on the network to transmit management data, the network management software transmits the request, including an object identifier (which will be described later) in a management packet or frame, to the agent at that managed node.

The agent analyzes the received object identifier and reads data corresponding to the object identifier. The obtained data is returned in the form of packets to the network management software. In the above operation, the agent may call a process to read the data.

The agents store management data associated with the respective nodes in the form of databases. Such a database is called an MIB (Management Information Base). FIG. 4 is a conceptual representation illustrating the structure of an MIB. As shown in FIG. 4, the MIB stores data in the tree structure in which identifiers are uniquely assigned to all respective nodes. In FIG. 4, the identifiers of the respective nodes are defined by numerals represented within parentheses. For example, in FIG. 4, node 401 has an identifier 1, and node 402 which is a child of node 401 has an identifier 1.3. Similarly, node 403 has an identifier 1.3.6.1.2. These identifiers of the nodes ate called object identifiers. Note that FIG. 4 shows a part of the entire MIB defined in the standard.

The MIB structure described above is called the Structure of Management Information (SMI) and is defined in RFC-115 as the Structure and Identification of Management Information for TCP/IP-based Internets.

A method of implementing an agent is to install an agent on a network board serving as an interface between a printer and a network. This method allows the printer to be managed by the network management software. This makes it possible for the user to acquire information about the printer under the management and modify its status using the network management software. More specifically, it is possible, e.g., to acquire a character string displayed on a liquid crystal display of the printer and to change the default paper cassette.

In the conventional technique, network management software for managing network devices at nodes to be managed is executed on a PC. However, rapid advances in the WWW technology have made it possible to execute network management software on a WWW server (WWW server 118, for example) such that a plurality of PCs can access the network management software via an interface called CGI (Common Gateway Interface). A program for realizing a WWW site is stored on a hard disk (HD) and the program is always executed by a CPU on the WWW server.

Referring to FIG. 11, the operation of a common type of WWW system and the operation of network device management program executed in the WWW system are briefly described below. In FIG. 11, a PC 901 corresponds to the WWW server 118. A WWW server program 911 is running on the PC 901. A large number of WWW page data described in HTML are stored on a disk of the PC 901. WWW browser programs 913 and 914 are running on PCs 903 and 904. When a particular WWW page is requested to be displayed by a user, the WWW browser program 913 or 914 transmits a request for the specified WWW page to the WWW server program 911 running on the PC 901. (PCs 901 and 904 correspond to PCs 103, 104, 111, or 112 shown in FIG. 1.)

In response to the request for the WWW page data from the WWW browser program 913 or 914, the WWW server program 911 transmits the specified WWW page data. The WWW browser program 913 or 914 analyzes the received WWW page data and displays the content of the page according to the description in the data.

In a case where the request for the WWW page data received from the WWW browser program 913 or 914 includes a request via the CGI (Common Gateway Interface), the WWW server program 911 executes an external script or an external program according to a predetermined CGI method and returns WWW page data produced by the external script or the external program to the WWW browser program 913 or 914.

The operation is described in further detail below for the case where network device management program is executed as the external program by the CGI in the above process. When the network device management program 921 is started by the WWW server program 911 via the CGI, the network device management program 921 acquires necessary MIB information on an agent of a network device to be managed, such as an agent 912 of a printer 902. In accordance with the acquired MIB information, the network device management program 921 produces WWW page data described in HTML and transfers the resultant data to the WWW server program 911. Herein, the printer 902 corresponds to the printer 102 shown in FIG. 1.

In the case of network management software using a WWW system, if an administrator of a network device (printer) forgets the device password assigned to the network device, the only possible manner of resetting a device password is to clear all current setting values by re-initializing the network device.

However, re-initialization of the network device causes all data set in the network device to be lost. This causes a significant loss to the user.

SUMMARY OF THE INVENTION

According to a first aspect of the present invention, to solve the above problems, there is provided a method for managing a network device by communicating with an information processing device and the network device via a network and managing the network device in response to a request from the information processing device. In this method, when a request for execution of a process, which needs particular authorization, upon the network device is received from the information processing device, it is determined whether a command to invalidate a password of the network device has been received together with the process execution request. If it has been determined that the command has been received, an invalidation request to invalidate the password of the network device is transmitted to the network device. In this first aspect of the present invention, it is also determined whether the password of the network device has been invalidated in response to the invalidation request; and if it has been determined that the invalidation has been performed, the process which needs particular authorization is executed.

In this first aspect of the present invention, in a case where it is determined that the invalidation has not been performed, error handling may be executed. In a case where it is determined that the invalidation has not been performed, a message may be transmitted to the information processing device to advise that the invalidation has not been performed.

Furthermore, in this first aspect of the present invention, the process which needs particular authorization is preferably executed by an SNMP agent running on the network device in response to a request transmitted using an SNMP protocol.

Furthermore, in this first aspect of the present invention, when it has been determined that the above-described command has not been received, a request to input a password may be transmitted to the information processing device, and it may then be determined whether a password transmitted in response to the input request and a password of the network device are consistent with each other.

In addition, in this first aspect of the present invention, the process execution request is preferably received from a WWW browser operating on the information processing device, via a WWW server operating in the network management device.

In this first aspect of the present invention, the invalidation request is preferably transmitted, using the SNMP protocol, to the SNMP agent operating on the network device.

Furthermore, in this first aspect of the present invention, information is preferably transmitted to the information processing device to display a screen on a display of the information processing device so that a command to perform a process which needs the particular authorization can be input via that screen.

According to a second aspect of the present invention, to solve the above-described problems, there is provided a method for managing a network device by communicating with an information processing device and the network device via a network and managing the network device in response to a request from the information processing device. In this method, when a request for execution of a process, which needs particular authorization, upon the network device is received from the information processing device, it is determined whether a command to ignore a password of the network device has been received together with the process execution request. If it is determined that the command has been received, the password of the network device is ignored and the process which needs particular authorization is executed.

In this second aspect of the present invention, the process which needs particular authorization may be executed by an SNMP agent running on the network device in response to a request transmitted using an SNMP protocol.

Furthermore, in this second aspect of the present invention, when it is determined that that the above-described command has not been received, a request to input a password may be transmitted to the information processing device, and it may then be determined whether a password transmitted in response to the input request and a password of the network device are consistent with each other.

Furthermore, in this aspect of the present invention, the process execution request is preferably received from a WWW browser operating on the information processing device, via a WWW server operating in the network management device.

Also, in this aspect of the present invention, information is preferably transmitted to the information processing device to display a screen on a display of the information processing device so that a command to perform a process which needs the particular authorization can be input via that screen.

The present invention also provides a network managing apparatus using the method according to the above-described first or second aspect, as well as a network management program and a computer-readable storage medium on which a network management program is stored, wherein the network management program implements the method according to first or second aspect of the invention.

Further objects, features and advantages of the present invention will become apparent from the following description of the preferred embodiments.

BRIEF DESCRIPTION OF THE DRAWINGS

FIG. 14 is a memory map of a storage medium on a program code is stored; and

DESCRIPTION OF THE PREFERRED EMBODIMENTS

Network System

Figure 1:
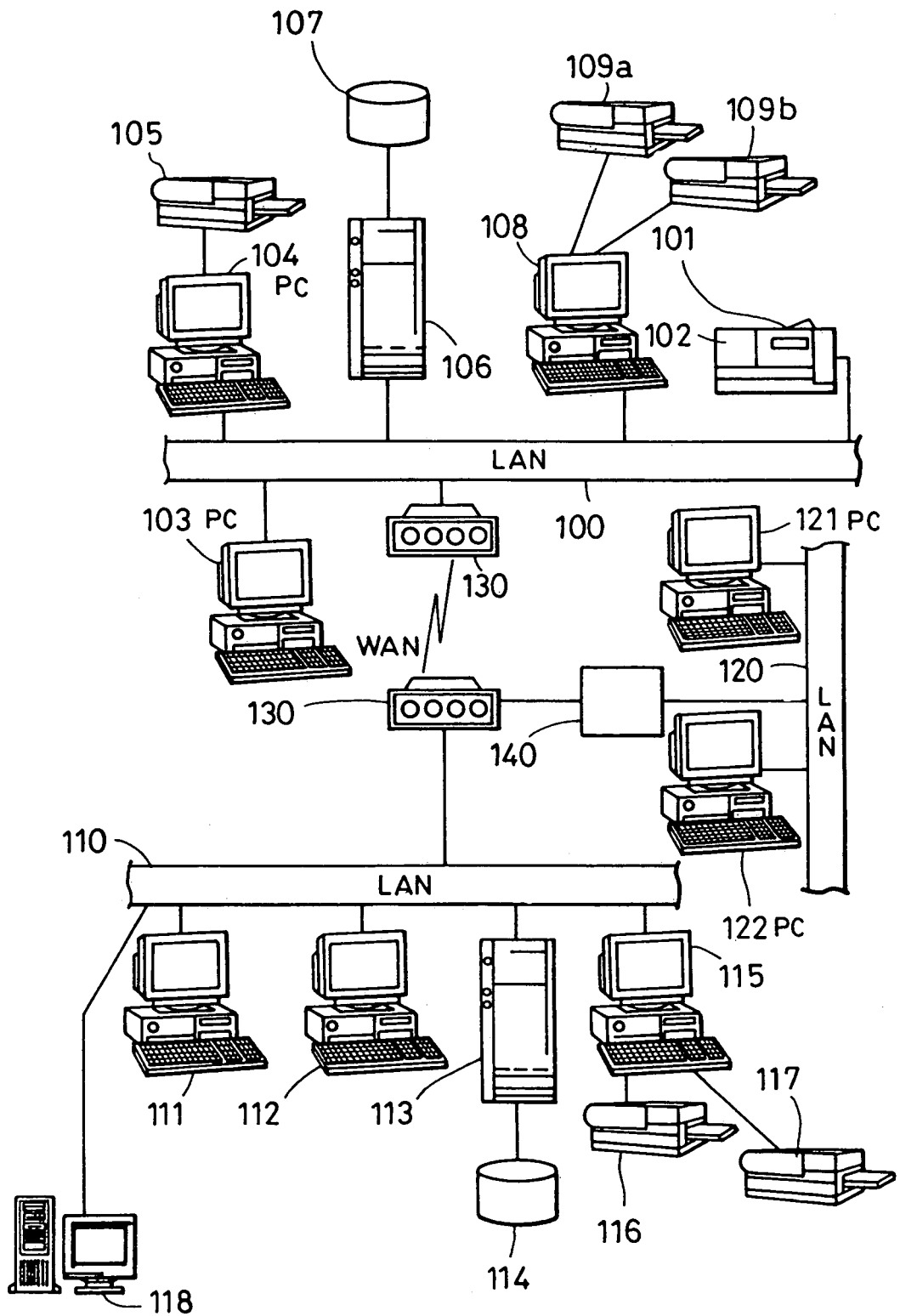
FIG. 1 is a schematic diagram illustrating an example of a large scale network system which needs management.

FIG. 1 is a schematic diagram illustrating an example of a large scale network system which needs management. In FIG. 1, a network board (NB) 101 serving as a printer-network interface is connected to a printer 102 having an open architecture. The NB 101 is connected to a local area network (LAN) 100 via a LAN interface such as an Ethernet interface 10Base-2 having a coaxial connector or 10Base-T having an RJ-45 connector.

Personal computers (PCs) such as a PC 103 and a PC 104 are connected to the LAN 100. These PCs can communicate with the NB 101 under the control of a network operating system. One of the PCs, for example the PC 103, may be assigned as a network management PC. A printer may be connected to each PC, as with printer 105 connected to PC 104.

A file server 106 is also connected to the LAN 100. The server 106 manages the access to files stored on a network device 107 having a high storage capacity (as high as, for example, 10 Gbytes). A print server 108 performs printing using a printer 109a or 109b connected to the print server 108 or using a printer at a remote location, such as printer 105. Other peripheral devices not shown in FIG. 1 may also be connected to the LAN 100.

In the network shown in FIG. 1, communication among various network members may be performed in an efficient manner using network software such as Novell® or Unix®. Various network software programs which may be employed in the present invention are available. An example is NetWare (trademark) available from Novell Inc. (detailed description of this software package can be found in on-line documentation which comes with a NetWare Package available from Novell Inc.).

The configuration shown in FIG. 1 is further described below. The file server 106 serves as a file management device which transmits data files among LAN members stores data files and performs queuing and caching. Data files produced by, for example, PCs 103 and 104 are transmitted to the file server 106. The file server 106 sorts the received data files and transmits a data file to the printer 109a in response to a command received from the print server 108. The PCs 103 and 104 produce data files, transmit the produced data files over the LAN 101, and receive data files via the LAN 100. The PCs 103 and 104 also display or process the data files. Although PCs are used in the system shown in FIG. 1, any other types of computer devices capable of executing the network software may also be employed. For example, a UNIX workstation using UNIX software may be connected to the network. Such a UNIX workstation may be used in a proper manner together with the PCs shown in FIG. 1.

In general, the LAN 100 is used to provide services to rather local user groups such as user groups on one floor or two or more successive floors in one building. In the case where a user is in another building or at a remote location such as a different prefecture, province, State, etc., a Wide Area Network (WAN) may be used. A WAN is basically a combination of a plurality of LANs connected to one another via a high speed digital line such as an Integrated Services Digital Network (ISDN).

That is, as shown in FIG. 1, a WAN is formed by connecting LANs 100, 110, and 120 to one another via a modulator/demodulator (modem)/transponder 130 and a backbone 140. These connections among LANs are simple electrical connections using a plurality of buses.

Each LAN includes various dedicated PCs such as a file server, a print server, and a WWW (World Wide Web) server. The WWW server collects documents including hypertexts and graphic data, and a WWW site is realized by such a WWW server. Any WWW site is uniquely identified by its URL (Uniform Resource Locator). The WWW server provides various kinds of information to PCs on which a reading program called a Web browser is running.

More specifically, as shown in FIG. 1, the LAN 110 includes a PC 111, a PC 112, a file server 113, a network disk 114, a print server 115, a printer 116, a printer 117, and a WWW server 118. In contrast, the LAN 120 includes only a PC 121 and a PC 122. The devices connected to the LAN 100, the LAN 110, and the LAN 120 can access functions of other devices connected to those LANS.

Network Devices

Figure 2:
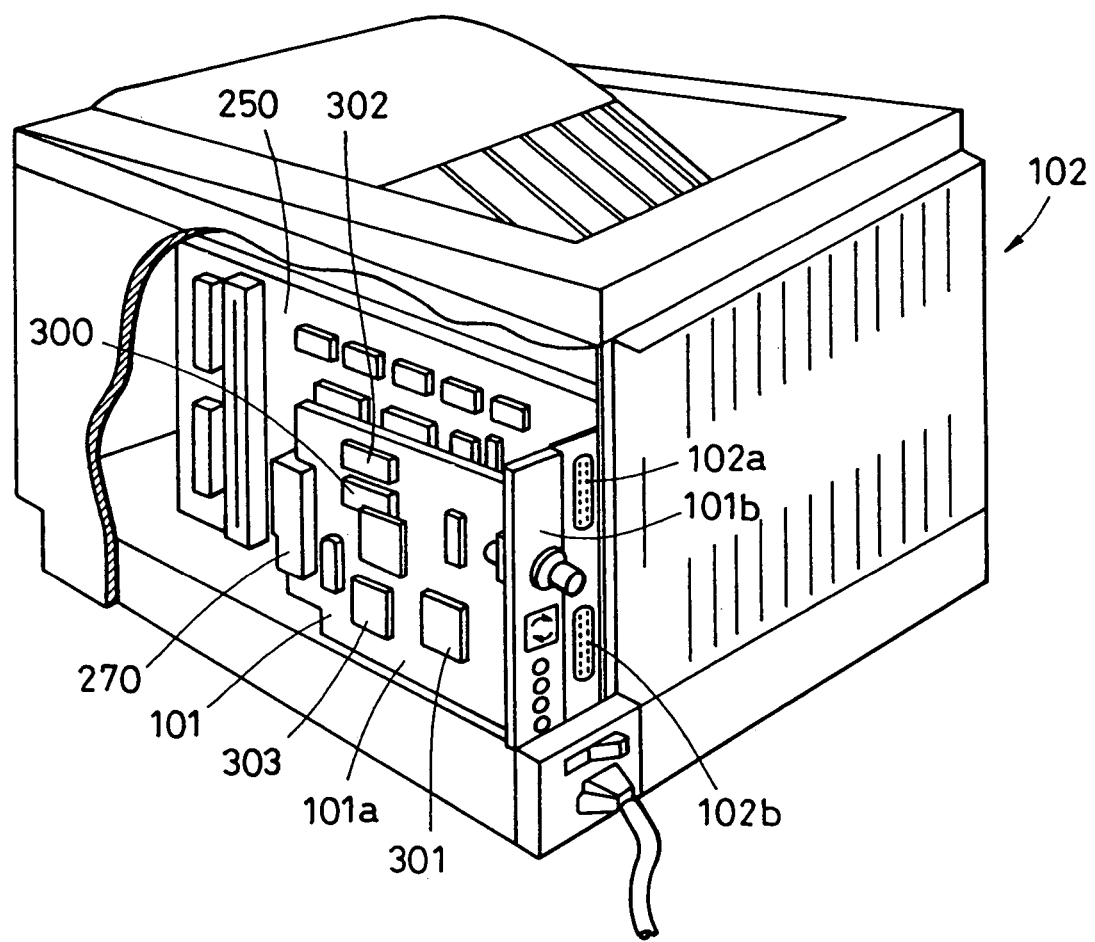
FIG. 2 is a cross-sectional view illustrating a printer including a network board installed therein.

A network board (NB) which is connected to a printer to implement an SNMP agent according to an embodiment of the present invention is described below. As shown in FIG. 2, an NB 101 is preferably installed in an internal extension I/O slot in a printer 102 such that it serves as an "embedded" network node having the capability of processing the processes described below and storing data.

By installing the NB 101, the printer 102 acquires strong auxiliary capabilities of controlling and managing a large multi-area WAN network system. The auxiliary capabilities may include the capability of monitoring and controlling the printer from a remote location (such as a network administrator's office), the capability of self management for providing a printer environment in which, after a print job is completed, an initial printing condition for a next user is guaranteed, and the capability of recording a log or statistical data about use of the printer, which can be access via the network to determine a schedule of replacing a toner cartridge or analyze the load of the printer.

The rapid advance of WWW technology has made it possible for the NB 101 itself to have its own WWW server (web server). In this case, like other WWW servers, the NB 101 has its own URL uniquely assigned thereto, and is capable of transmitting and receiving information described in HTTP (Hyper Text Transfer Protocol) to monitor the status of the printer and control it. A Web browser on a PC can monitor the status of the printer and control it by specifying the URL of the NB 101.

An important factor in the design of the NB is a capability of accessing the printer via a bidirectional interface such as a shared memory, to control the printer from the NB 101. Instead of the shared memory, a SCSI interface or the like may be used as the interface. Thus, printer status information is transmitted to the NB 101 or another external network node thereby allowing realization of various auxiliary capabilities. Print image information and control information produced by a microprocessor disposed in the NB 101 and described in the shared memory and read by the printer 102. Conversely, printer status information is transmitted from the printer to the shared memory and read by the NB processor.

FIG. 2 is a cross-sectional view illustrating the NB 101 installed in the printer 102. As shown in FIG. 2, the NB 101 includes a phase plate 101*b* for connection with a network and a printed circuit board 101*a* installed on the phase plate 101*b*. The NB 101 is connected to a printer interface card 250 via a connector 270. The printer interface card 250 directly controls a printer engine of the printer 102. Print data and a printer control command are input from the NB 101 to the printer interface card 250 via the connector 270. On the other hand, printer status information is output from the printer interface card 250 via the connector 270. The NB 101 transmits the printer status information over the LAN 101 via a network connector provided on the phase plate 101*b*. The printer is also capable of receiving print data via a conventional serial port 102*a* or a parallel port 102*b*.

Figure 3:
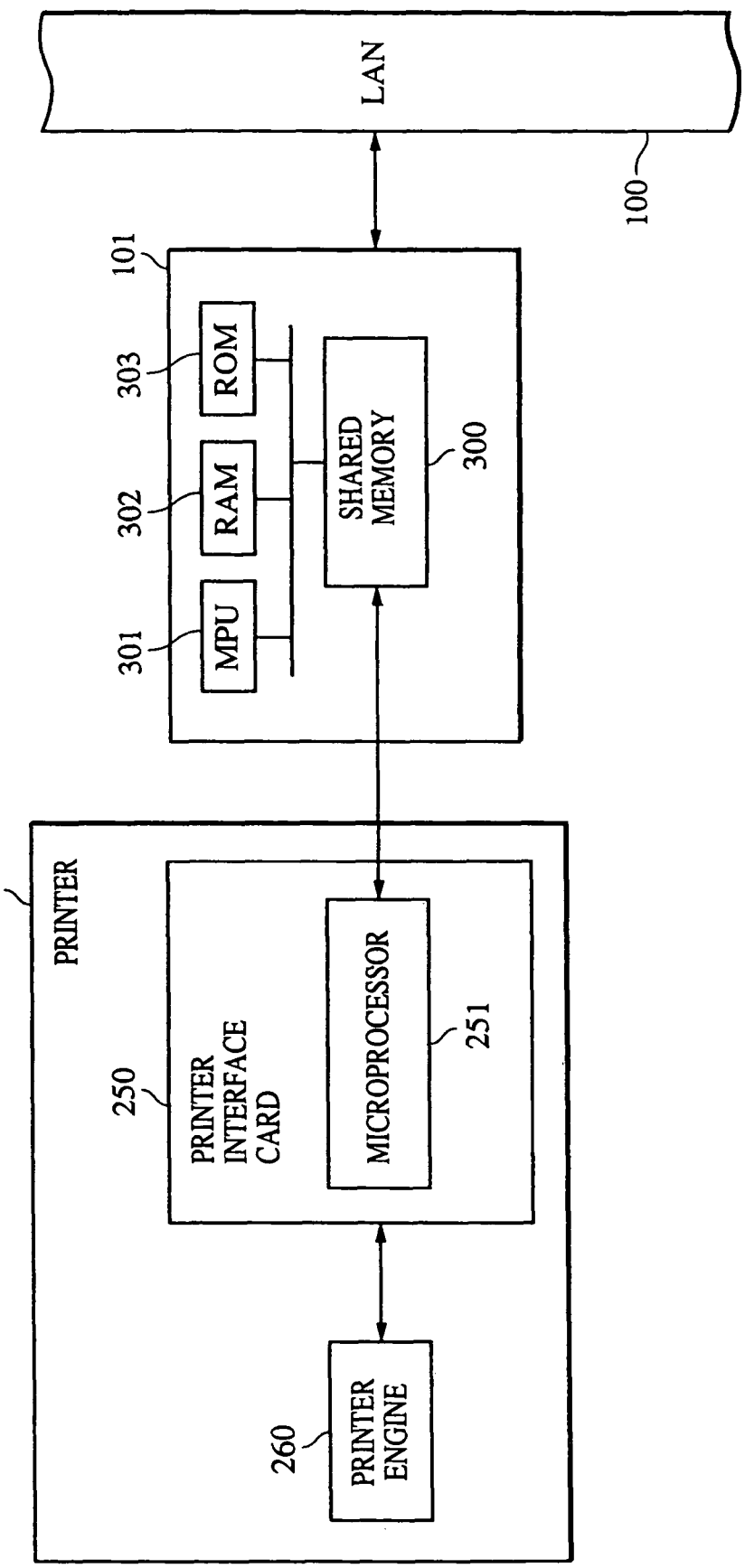
FIG. 3 is a block diagram illustrating electrical connections among a network board, a printer, and a LAN.
Figure 4:
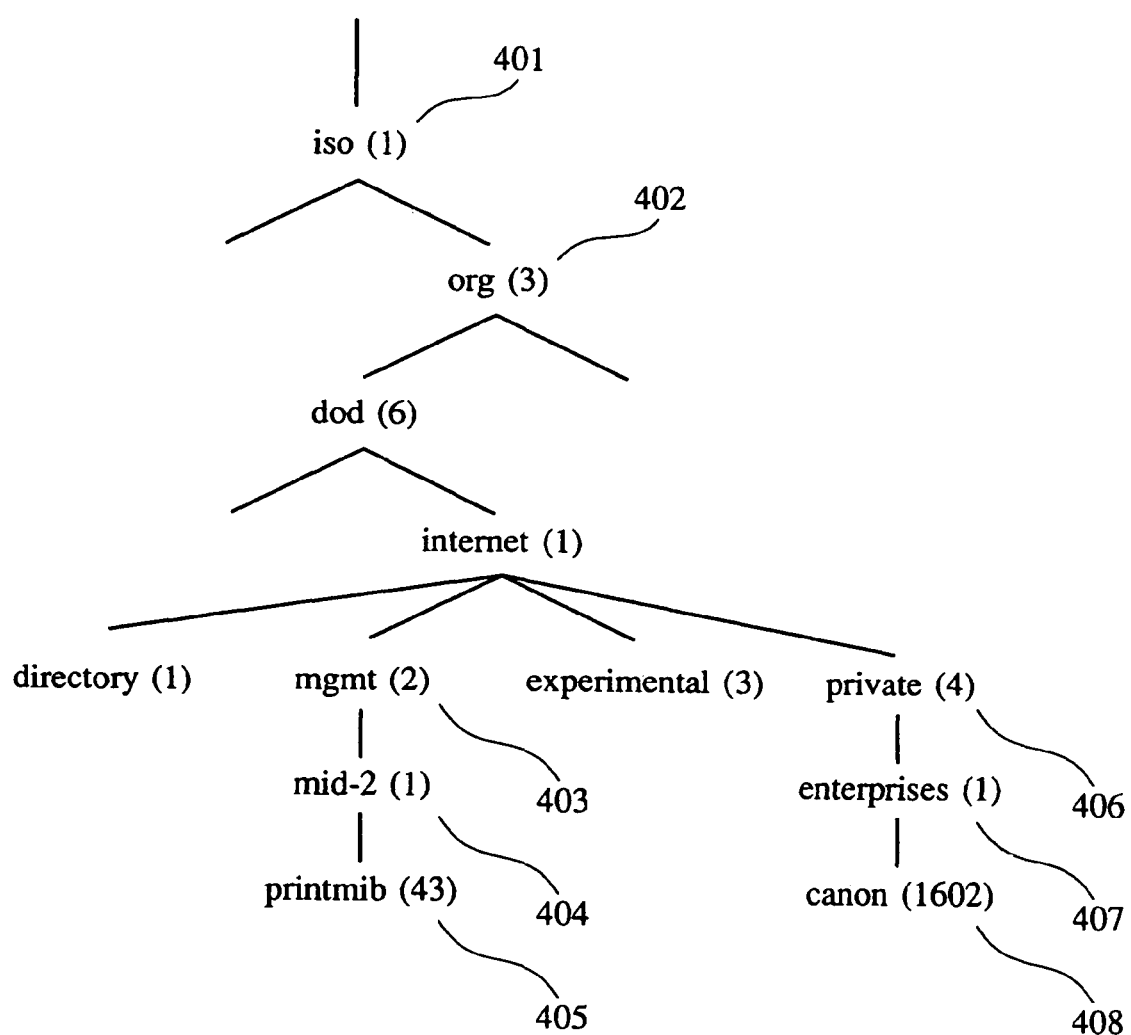
FIG. 4 is a conceptual representation of the structure of an MIB.

FIG. 3 is a block diagram illustrating electrical connections among the NB 101, the printer 102, and the LAN 100. The NB 101 is connected to the LAN 100 via a LAN interface and directly to the printer 102 via the printer interface card 250. The NB 101 includes a microprocessor 301 for controlling the NB 101, a ROM 303 for storing a program executed by the microprocessor 301, a RAM 302 used as a work area by the microprocessor 301 when the program is executed, and a shared memory 300 used to transfer data between the NB 101 and the printer interface card 250, wherein these parts are connected to one another via an internal bus.

The program according to which the NB 101 operates as an SNMP agent is stored in the ROM 303. The microprocessor 301 operates according to the program stored in the ROM 303, using the RAM 302 as a work area. The shared memory 300 is used as a buffer area in communication with the printer interface card 150.

A microprocessor 251 of the printer interface card 250 transmits and receives data to and from the NB 101 via the shared memory 300 disposed in the NB 101. The microprocessor 251 of the printer interface card 250 also communicate with a printer engine 260 which controls a printer mechanism.

Network Management Device

Figure 5:
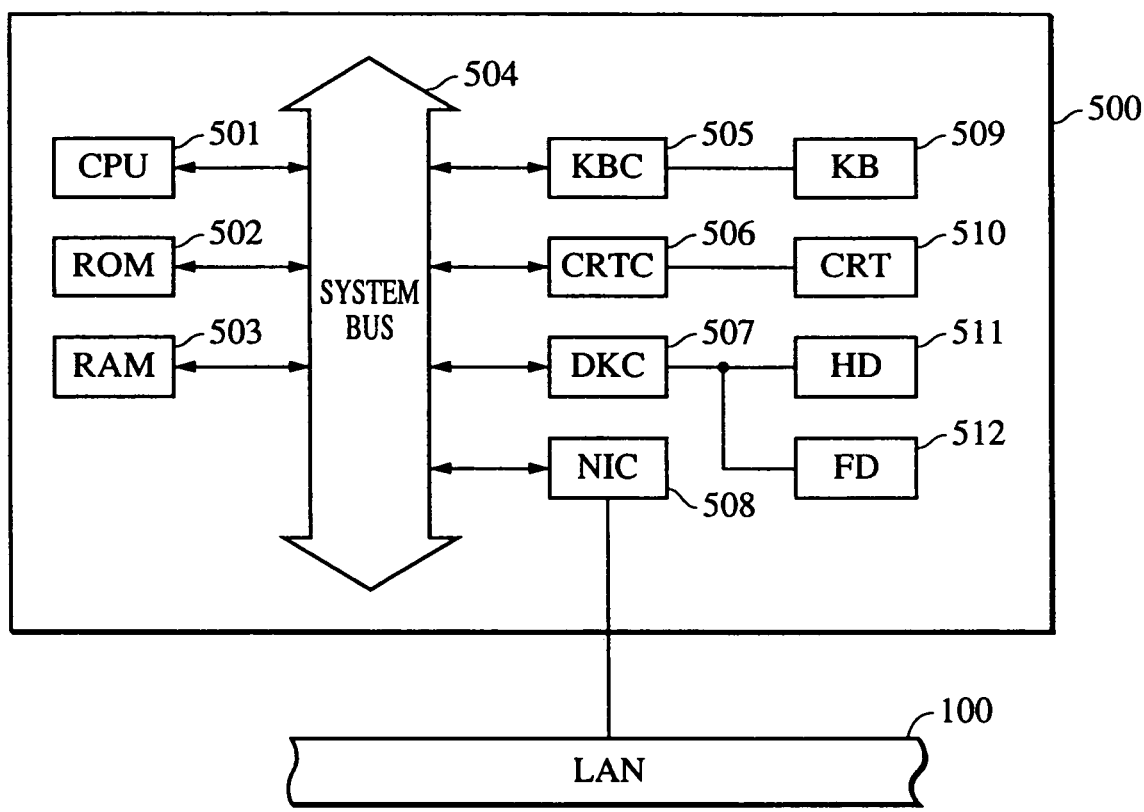
FIG. 5 is a block diagram illustrating a configuration of a PC capable of executing network management software.

A PC on which network management software is executed is described below. FIG. 5 is a block diagram illustrating a configuration of a PC capable of executing network management software. In FIG. 5, reference numeral 500 denotes a PC which is similar to the PC 103 shown in FIG. 1 and which is capable of executing network management software. The PC 500 includes a CPU 501 for executing network management software which is stored in a ROM 502 or a hard disk (HD) 511 or which is supplied via a floppy disk drive (FD) 512, thereby generally controlling respective devices connected to a system bus 504.

Reference numeral 503 denotes a RAM serving as a main memory and a work area of the CPU 501. Reference numeral 505 denotes a keyboard controller (KBC) for controlling inputting of a command via a keyboard (KB) 509 or a pointing device (not shown). Reference numeral 506 denotes a CRT controller (CRTC) for controlling the displaying operation of a CRT display (CRT) 510. Reference numeral 507 is a disk controller (DKC) for controlling a hard disk (HD) 511 and a floppy disk drive (FD) 512 for storing a boot program, various application programs, an edited file, a user file, and network management software. Reference numeral 508 denotes a network interface card (NIC) for transmitting and receiving data to and from an agent or a network device via the LAN 100.

In a conventional technique, a network management device is realized on a PC similar to the PC used to realize the network management device shown in FIG. 5.

The network management software, which is an essential part in any operation described below, is stored on the hard disk (HD) 511. In the following description, the CPU 501 serves as a main hardware part which executes the network management software and the network management software is a main part of the software, unless otherwise stated.

In the present invention, the network management software may be supplied via a storage medium such as a floppy disk or a CD-ROM. In this case, the program is read from the storage medium by the floppy disk driver 512 shown in FIG. 5 or a CD-ROM drive (not shown) and installed on the hard disk (HD) 511.

Network Management Software

Figure 6:
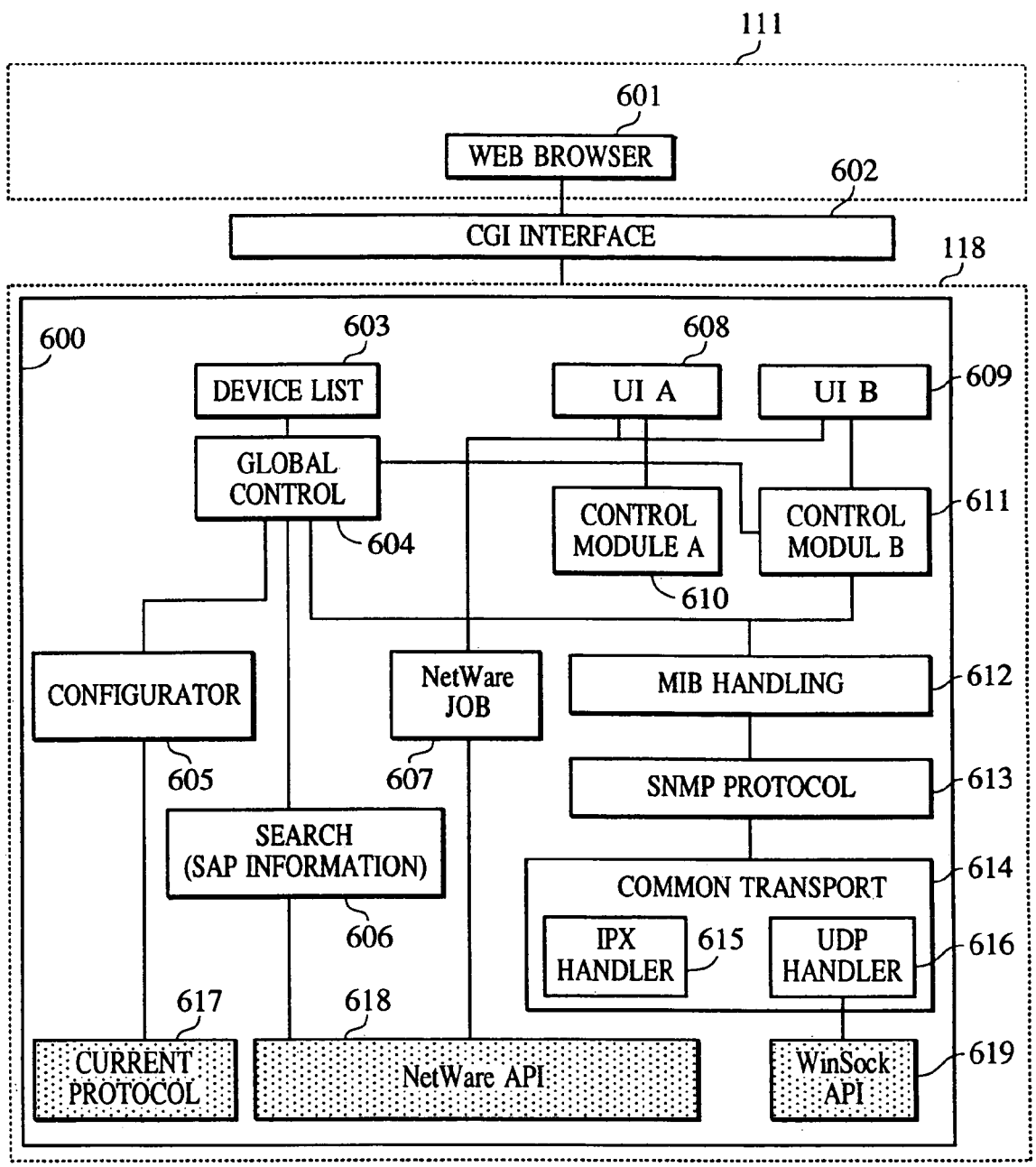
FIG. 6 is a module diagram of network management software executed on a WWW server, according to the present invention.

The structure of network management software executed on a WWW server 118, according to one possible embodiments of the present invention, is described below. FIG. 6 is a module diagram of such network management software executed on the WWW server 118.

The network management software according to this embodiment of the present invention is stored on the hard disk (HD) 511 shown in FIG. 5 and executed by the CPU 501. The CPU 501 uses the RAM 503 as a work area in execution of the network management software.

In FIG. 6, reference numeral 600 denotes network management software. Reference numeral 601 denotes a Web browser serving as a reading program running on a PC (such as a PC 111). Reference numeral 602 denotes a CGI interface used by the Web browser 601 to communicate with the network management software 600 via a WWW server program (not shown) of the WWW server.

Reference numeral 603 denotes a device list module (also referred to simply as a device list). The device list module 603 is a module for displaying, on the Web browser 601, a list of network devices connected to the network. Reference numeral 604 denotes a global control module (also referred simply as a global control). The global control module 604 controls the other modules in response to a command from the device list module 603.

Reference numeral 605 denotes a configurator module. The configurator module 605 is a module for performing a special process associated with the network setting of the agent. Reference numeral 606 denotes a search module. The search module 606 is a module for searching for network devices connected to the network. Network devices retrieved by this module are displayed in the form of a list on the Web browser 601 by the device list module 603. Reference numeral 607 denotes a NetWare module for acquiring information about the status of a print job from the network server via a NetWare API 618. Reference numerals 608 and 609 denote modules for displaying a device information window on the Web browser 601 to display detailed information about the network devices being managed. These modules are provided for respective types of devices the detailed information about which is to be displayed. Reference numerals 610 and 611 denote control modules. The control modules 610 and 611 perform special control processes peculiar to the respective types of devices the detailed information of which is to be acquired. These modules are also provided for the respective types of devices the detailed information about which is to be displayed. The control modules 610 and 611 acquire MIB data (MIB information) from network devices being managed via an MIB module 612. The acquired data is transferred to the UI modules 608 and 609.

The MIB module 612 is a module for performing conversion between object identifiers and object keys. The object keys are represented in 32-bit integers, and there is a one-to-one correspondence between the object keys and the object identifiers. Because the object identifiers vary in length, it is difficult for the network management software to handle the object identifiers directly. To avoid the above problem, the network management software uses internal object keys having a fixed length and having the one-to-one correspondence with the object identifiers. Modules at levels higher than the MIB module 612 also use the object keys to handle the MIB information.

Reference numeral 613 denotes an SNMP module. The SNMP module 613 transmits and receives SNMP packets. Reference numeral 614 denotes a common transport module. The common transport module 614 is a module for absorbing a difference from a lower-level protocol for transporting SNMP packets. In operation of the network management software, data is transferred by an IPX handler module 615 or a UDP handler module 616, depending upon the protocol selected by a user.

A current protocol 617 is a protocol which is selected by the user (in this embodiment, the selection is made between the IPX protocol and the UDP protocol) during operation and which is used by the configurator module 605.

The program of the network management software 600 executed according to a sequence which will be described later is stored on a storage medium (ROM 502, RAM 503, HD 511, FD 512). The main part of hardware responsible for execution of the sequence is the CPU 501, and the main part of software responsible for execution of the sequence is the network management software.

First Example of a Process Which Needs Administrator Authorization

Figure 7:
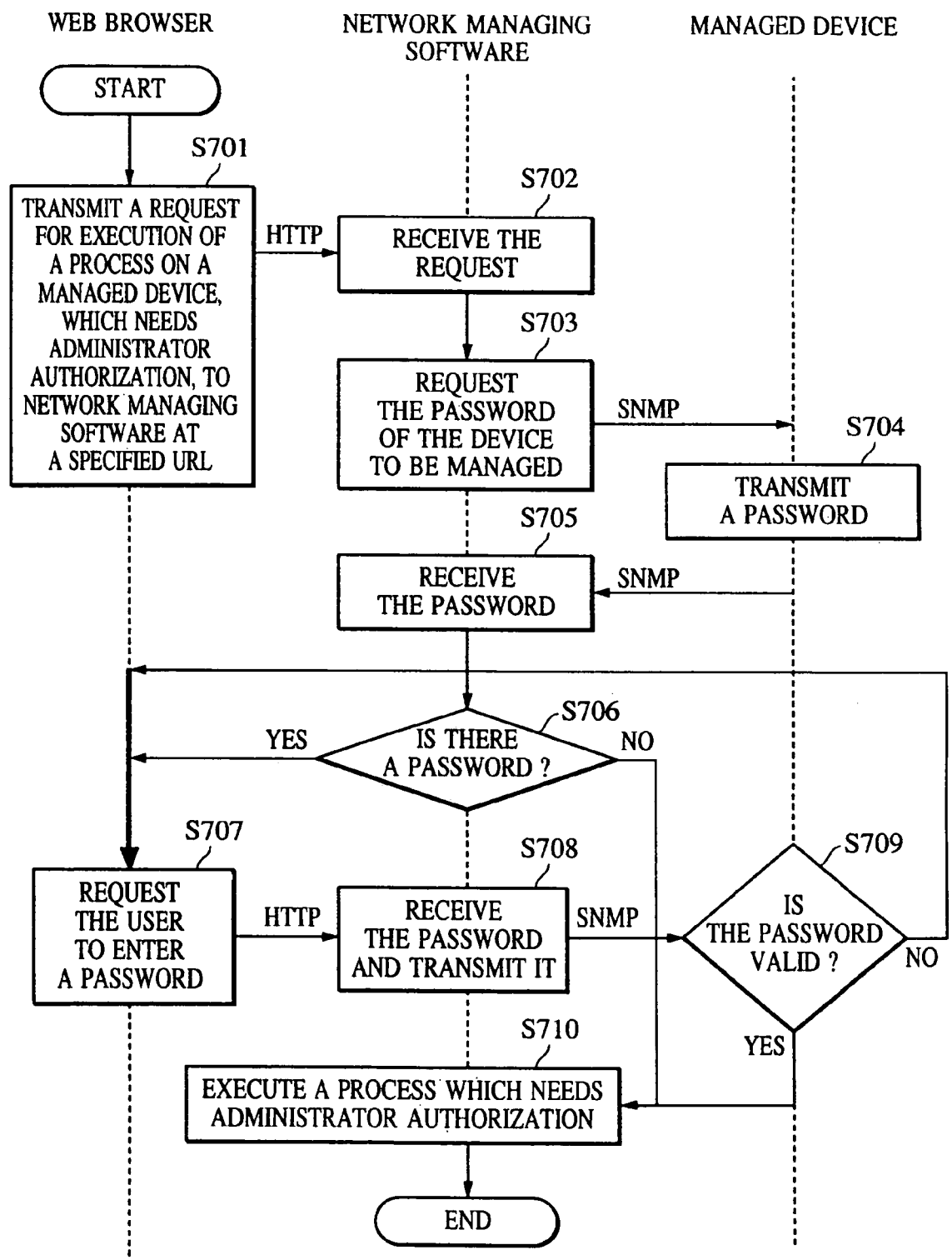
FIG. 7 is a flow chart illustrating an example of a sequence in which network management software performs a process, which needs administrator authorization, upon a managed network device.

A sequence executed by the network management software 600 running on the WWW server 118 to perform, in response to a request from the Web browser 601, a process which needs administrator, authorization on a network device under the management of the network management software is described below. FIG. 7 is a flow chart illustrating an example of a sequence according to which the network management software 600 performs a process, which needs administrator authorization, upon a managed network device in response to a request from the Web browser 601. First, in step S701, if a user inputs, to the Web browser 601, data specifying the URL of the network management software 600 on the WWW server 118, the Web browser 601 issues, using an HTTP protocol, a request for execution of a process which needs administrator authorization upon a managed network device.

In step S702, the network management software 600 receives the request issued in step S701 from the WWW server via the CGI interface 602. Thereafter, in steps S703 and S705, the network management software 600 acquires the device password from the managed network device using the SNMP protocol. On the other hand, in step S704, the managed network device transmits its password in response to the password request issued in step S703.

In step S706, the network management software 600 determines whether or not the device password is valid. If the device password is invalid (and also in a case where no device password is assigned), the process goes to step S710.

If it is determined that the device password is valid, the Web browser 601 is informed that the password is valid. In response, the Web browser 601 displays a screen to prompt the user to input a device password. The network management software 600 receives the password input by the user and transmits it to the managed network device, using the HTTP protocol. In step S709, the network device determines whether or the not the password received from the network management software is valid. If this password is invalid, the process returns to step S707, while if this password is valid, the process goes to step S710.

In step S710, the process which needs the administrator authorization is executed in response to the request issued in step S701.

Thus, users other than the administrator cannot modify the setting (such as a network address) of the network device.

Second Example of a Process Which Needs Administrator Authorization

Figure 8:
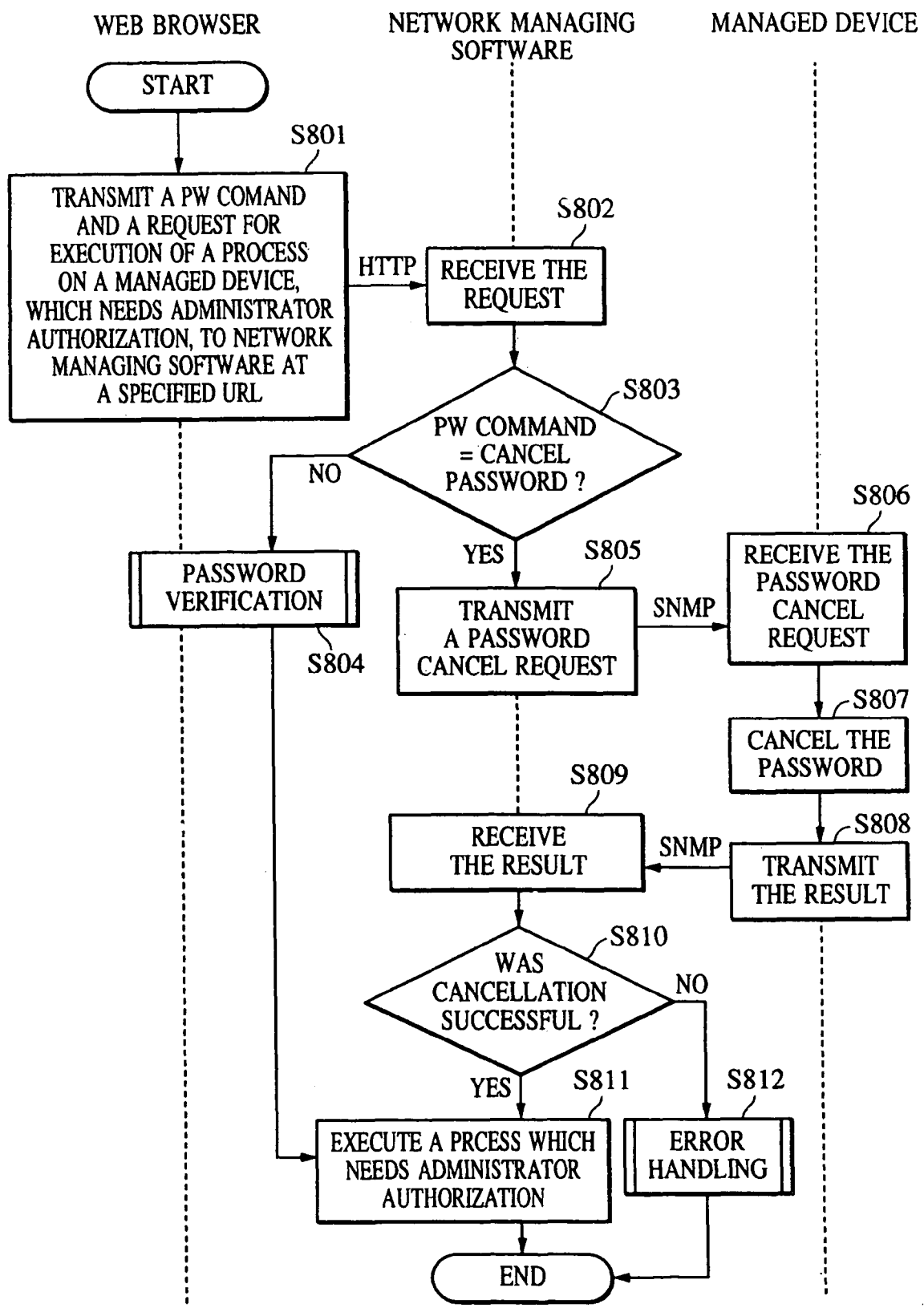
FIG. 8 is a flow chart illustrating another example of a sequence in which network management software performs a process, which needs administrator authorization, upon a managed network device.

FIG. 8 is a flow chart illustrating another example of a sequence according to which the network management software 600 performs a process, which needs administrator authorization, upon a managed network device in response to a request from the Web browser 601. The sequence shown in FIG. 8 is similar to that shown in FIG. 7, except that the sequence includes steps of handling a "password invalidation command" to invalidate a device password assigned to a network device.

In step S801, if a user inputs, to the Web browser 601, data specifying the URL of the network management software 600 on the WWW server 118, the Web browser 601 issues, using an HTTP protocol, a request for execution of a process which needs administrator authorization upon a managed network device. In this step, the request is transmitted together with a password invalidation command input by the user.

In step S802, the network management software 600 receives the request issued in step S801 from the WWW server via the CGI interface 602. In step S803, the content of the request received in step S802 is analyzed to determine whether the received request includes a command to invalidate the device password. If the password invalidation command is not included, the process goes to step S804. Step S804 corresponds to steps S703 to S709 shown in FIG. 7, and thus step S804 is not described in further detail herein.

In a case where the password invalidation command is included in the received request, the process goes to step S805. In step S805, a device password invalidation request is transmitted to the specified network device under the management. A specific example of the device password invalidation request is to overwrite the device password with " " (a character string with a length of 0).

In step S806, the network device under the management receives the request from the network management software 600. In the next step, S807, the device password is invalidated. Thereafter, in step S808, the network device transmits a message indicating the result of the invalidation of the device password to the network management software 600. In step S809, the network management software 600 receives the message transmitted in step S808 by the network device. In step S810, the received message is analyzed to determine whether the invalidation of the device password has been performed successfully. If the invalidation is successful, the process which needs administrator authorization is performed. If the invalidation is not successful, predetermined error handling is performed. More specifically, a message indicating that the invalidation of the device password has not been performed is produced and transmitted to the Web browser 601. In this sequence, as described above, when the administrator of the device forgets the device password assigned to the network device under the management, the administrator can invalidate the device password via the WWW server, and after invalidation of the password, the administrator can perform a process which needs administrator authorization using the network device.

Third Example of a Process Which Needs Administrator Authorization

Figure 9:
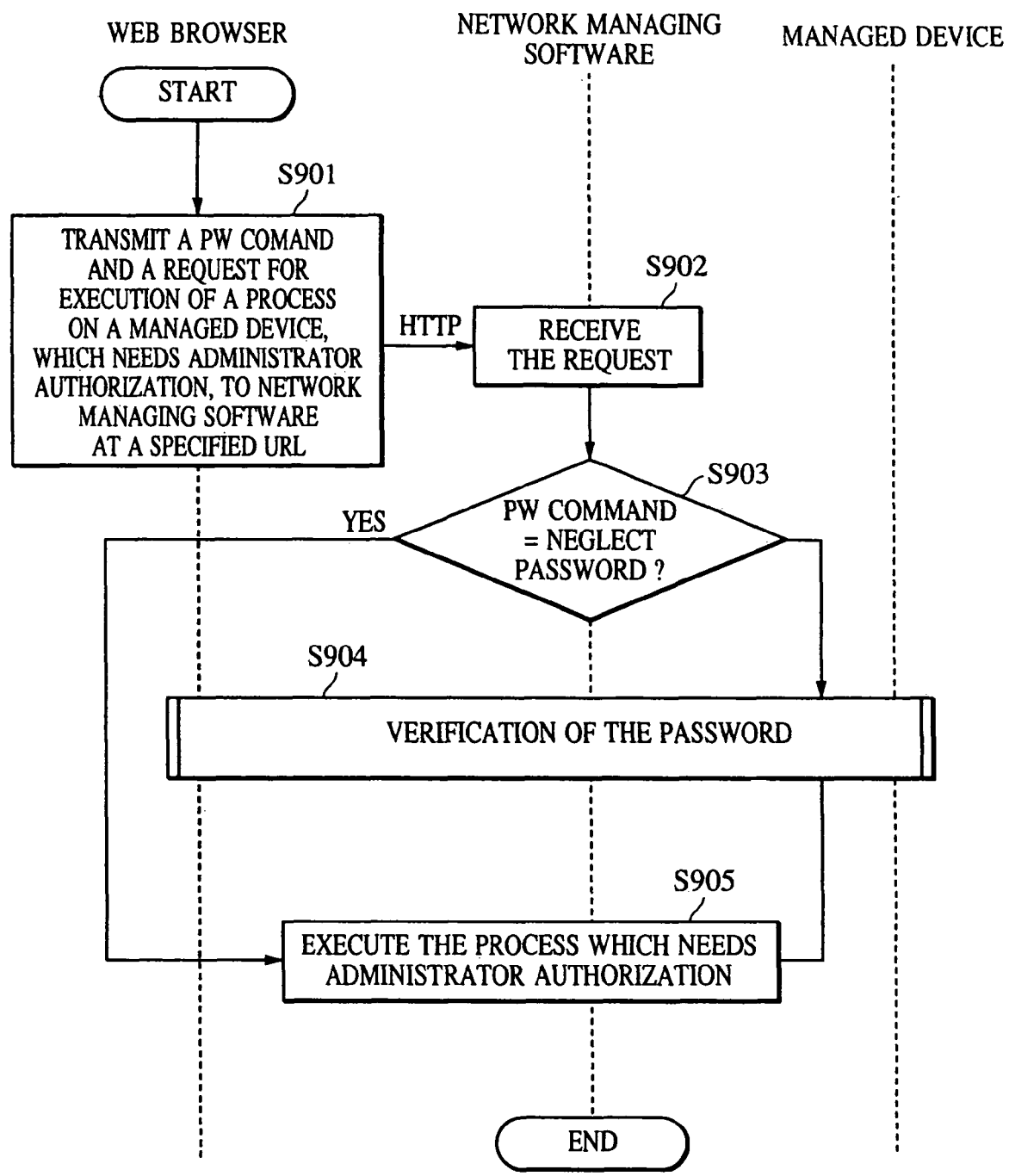
FIG. 9 is a flow chart illustrating still another example of a sequence in which network management software performs a process, which needs administrator authorization, upon a managed network device.

FIG. 9 is a flow chart illustrating still another example of a sequence according to which the network management software 600 performs a process, which needs administrator authorization, upon a managed network device in response to a request from the Web browser 601. The sequence shown in FIG. 9 is similar to that shown in FIG. 7 or 8, except that the sequence includes steps of handling a "password ignore command" to ignore a device password assigned to a network device.

In step S901, if a user inputs, to the Web browser 601, data specifying the URL of the network management software 600 on the WWW server 118, the Web browser 601 issues, using an HTTP protocol, a request for execution of a process which needs administrator authorization upon a managed network device. In this step, the request is transmitted together with a password ignore command input by the user.

In step S902, the network management software 600 receives the request issued in step S901 from the WWW server via the CGI interface 602. In step S903, the content of the request received in step S902 is analyzed to determine whether the received request includes a command to ignore the device password.

In the case where the device password is to be ignored, the process which needs administrator authorization is immediately performed in step S905, using the specified network device under the management. In a case where the device password is not ignored, the process goes to step S904. Step S904 corresponds to steps S703 to S709 shown in FIG. 7.

In this sequence, as described above, when the administrator of the device forgets the device password assigned to the network device under the management, the administrator can issue a command to ignore the device password via the WWW server. After issuing the command to ignore the password, the administrator can perform a process which needs administrator authorization, using the network device.

Fourth Example of a Process Which Needs Administrator Authorization

Figure 10:
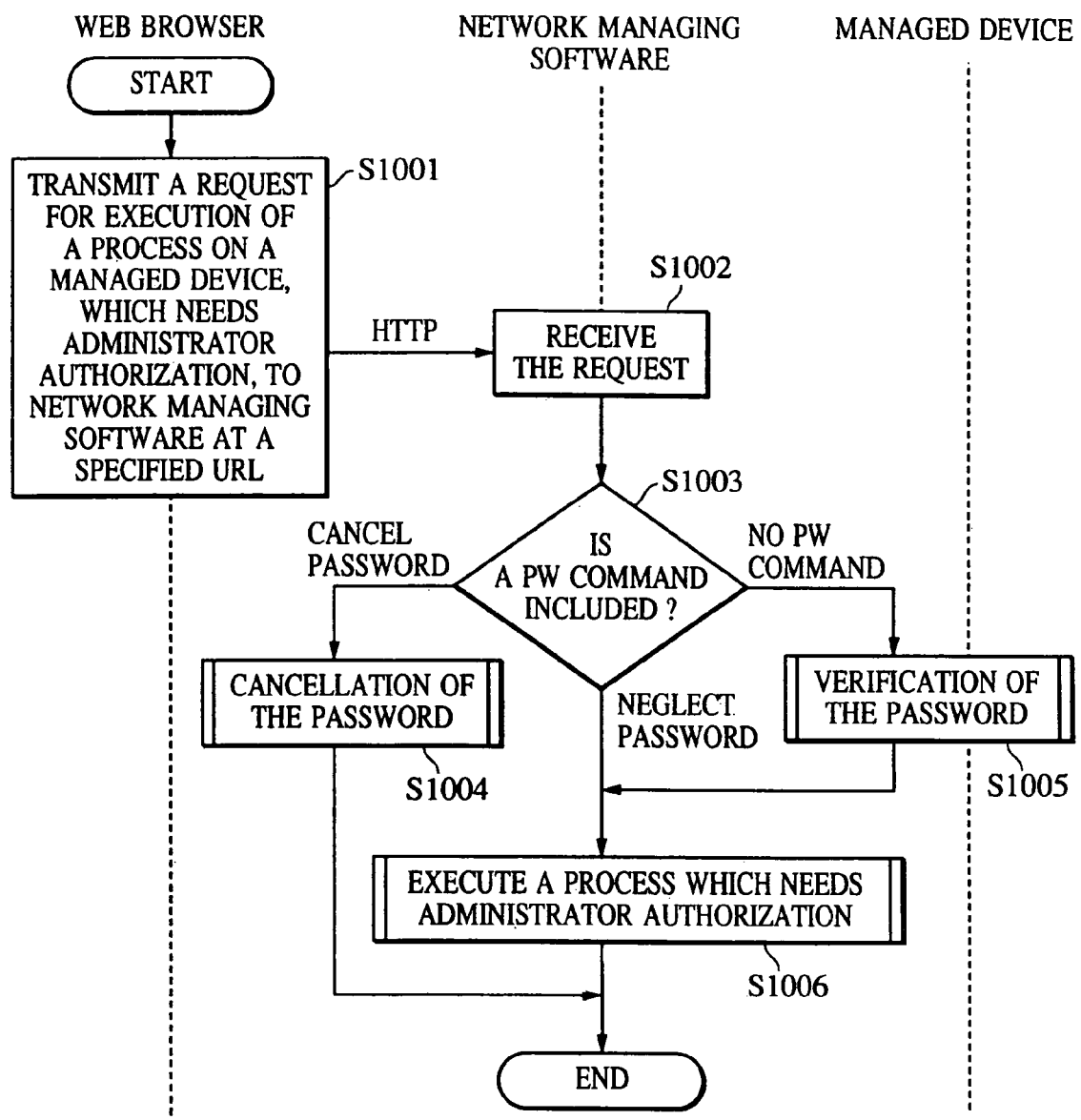
FIG. 10 is a flow chart illustrating still another example of a sequence in which network management software performs a process, which needs administrator authorization, upon a managed network device.
Figure 11:
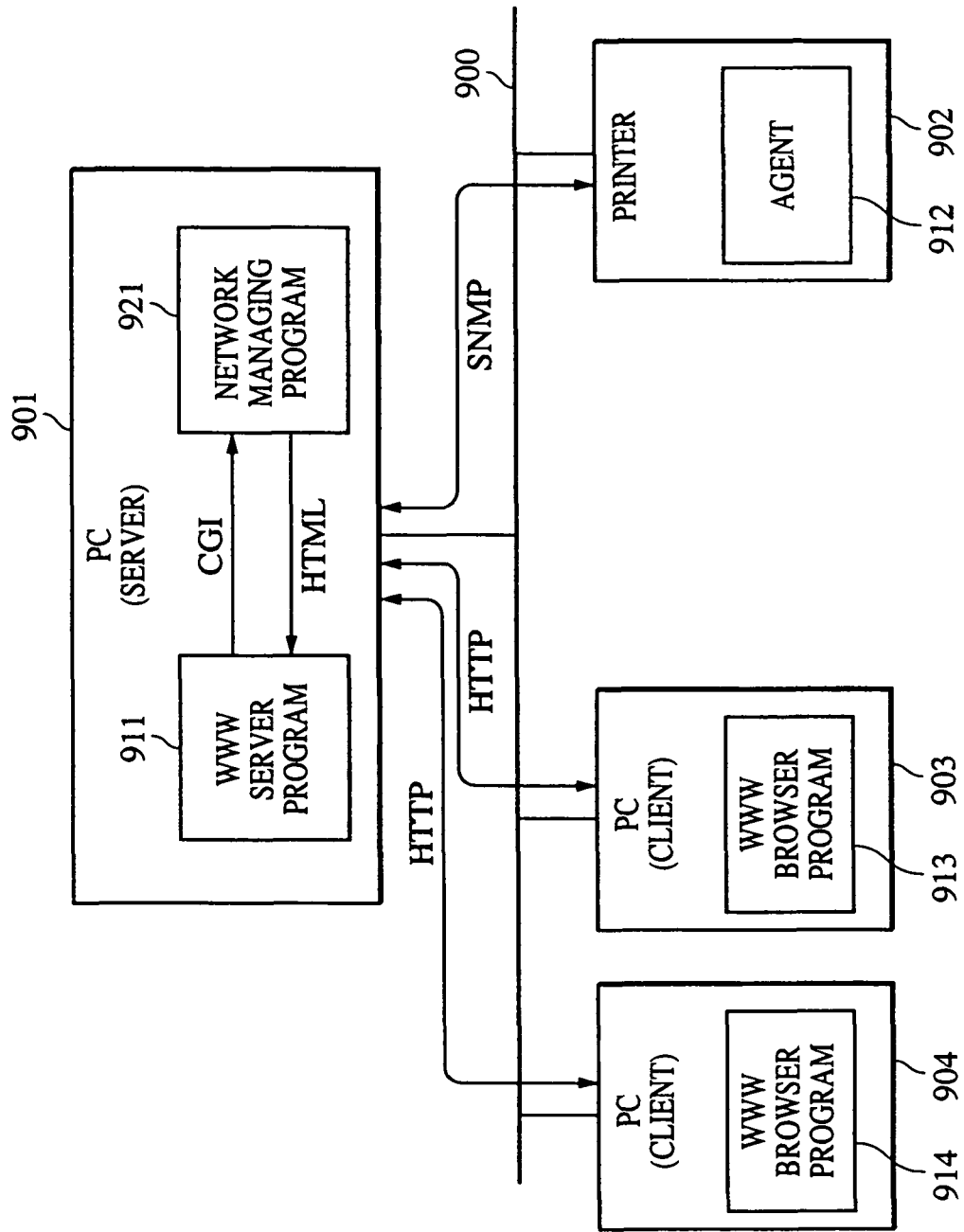
FIG. 11 is a diagram illustrating an operation of a common WWW system and an operation of a network device management program executed in the WWW system.

FIG. 10 is a flow chart illustrating another example of a sequence according to which the network management software 600 performs a process, which needs administrator authorization, upon a managed network device in response to a request from the Web browser 601. The sequence shown in FIG. 10 is a combination of sequences shown in FIGS. 7, 8, and 9.

In step S1001, if a user inputs, to the Web browser 601, data specifying the URL of the network management software 600 on the WWW server 118, the Web browser 601 issues, using an HTTP protocol, a request for execution of a process which needs administrator authorization upon a managed network device. In this step, the request is transmitted together with a password command if it is input by the user.

In step S1002, the network management software 600 receives the request issued in step 1001 from the WWW server via the CGI interface 602. In step S1003, the content of the request received in step S1002 is analyzed to determine whether the request includes a password command. If a password command is included, it is further determined whether the password command indicates that the device password should be ignored or invalidated.

In the case where no password command is included, the process goes to step S1005. Step S1005 corresponds to steps S703 to S709 shown in FIG. 7. In a case where the device password is to be ignored, the process which needs administrator authorization is immediately performed in step S1006, using the specified network device. In a case where the device password is to be invalidated, the process goes to step S1004, which corresponds to steps S805 to S812 shown in FIG. 8.

Printer

Figure 12:
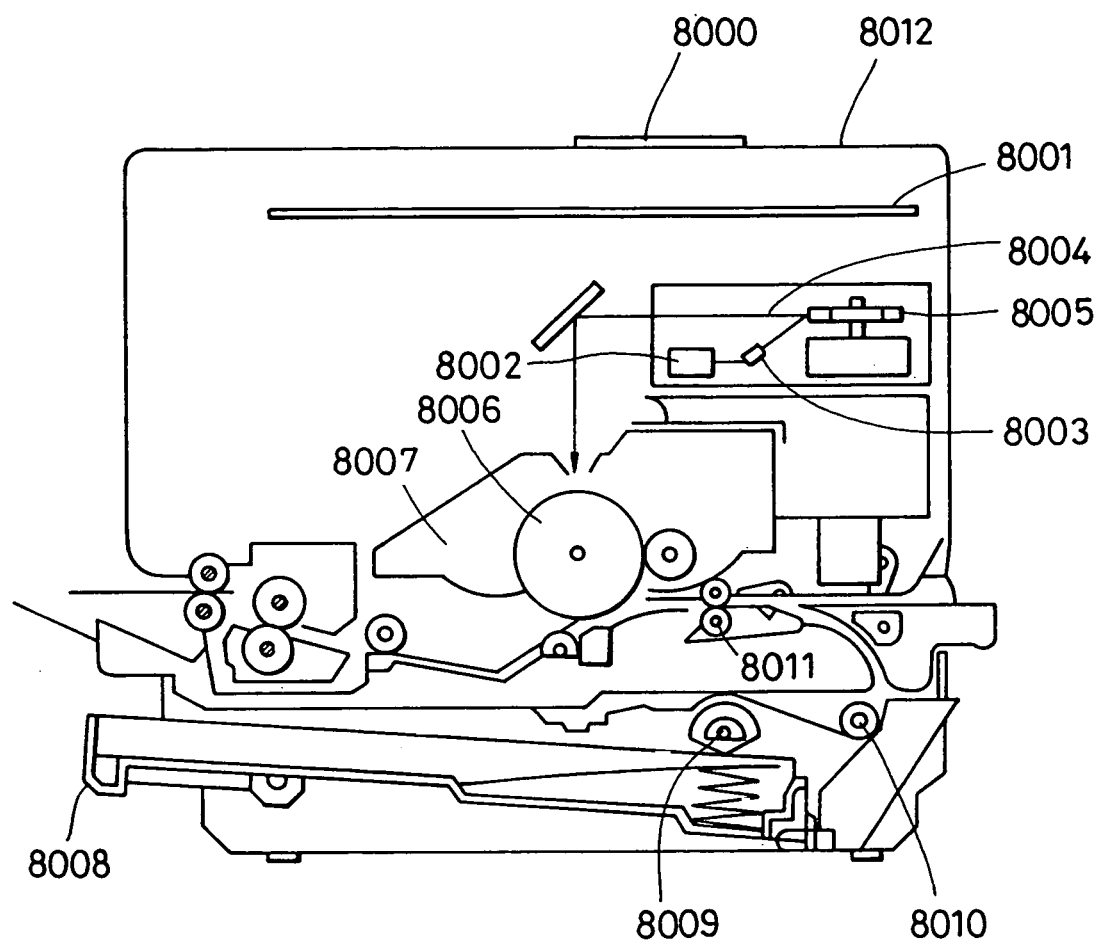
FIG. 12 is a cross-sectional view illustrating the internal structure of a laser beam printer.

FIG. 12 is a cross-sectional view illustrating the internal structure of a laser beam printer (hereinafter referred to as an "LBP") which is an example of a device managed by the network management software. The LBP is capable of printing an image on paper in accordance with input character pattern data. In FIG. 12, reference numeral 8012 denotes a main part of the LBP, which forms an image on print paper serving as a recording medium in accordance with supplied character pattern data. Reference numeral 8000 denotes an operation control panel on which switches for controlling the operation and LED indicators or the like are disposed. Reference numeral 8001 denotes a printer control unit serving to control the entire LBP 8012 and to analyze character pattern information. The main operation performed by the printer control unit 8001 is to convert character pattern information into a video signal and outputs the resultant signal to a laser driver 8002. The laser driver 8002 is a circuit for driving a semiconductor laser 8003. The laser driver 8002 turns on and off the laser beam 8004 emitted by the semiconductor laser 8003 in accordance with the input video signal. The laser beam 8004 is deflected to right and left by a rotating polygonal mirror 8005 such that an electrostatic drum 8006 is scanned by the laser beam 8004. As a result, a latent electrostatic image of a character pattern is formed on the electrostatic drum 8006. The latent image is then developed by a developing unit 8007 disposed near the electrostatic drum 8006 and transferred to the print paper. Cut sheets are used as the print paper. Cut sheets are disposed in a plurality of paper cassettes 8008 depending upon the sizes of cut sheets, and the cassettes 8008 are attached to the LBP 8012. A cut sheet is fed into the LBP 8012 via a sheet feed roller 8009 and transport rollers 8010 and 8011.

Figure 13:
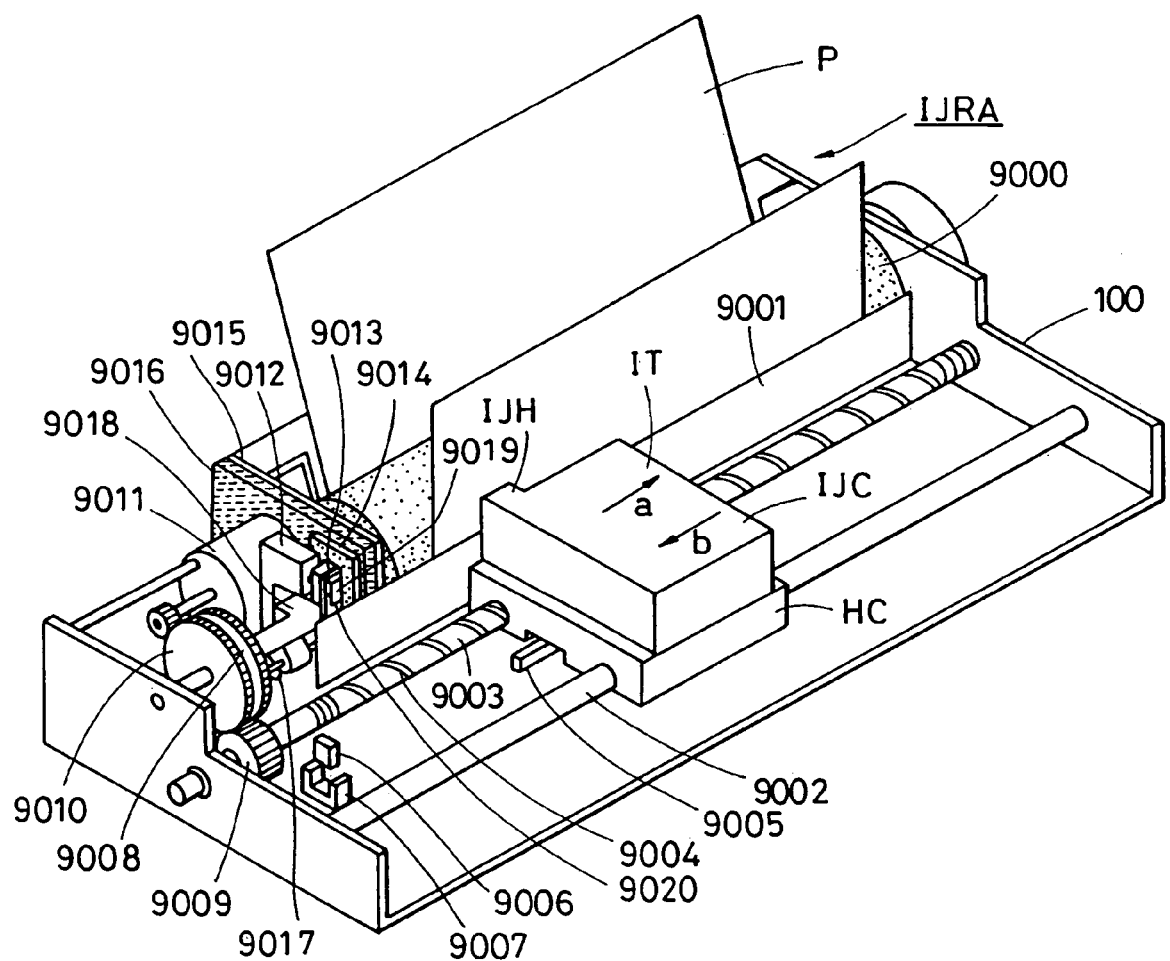
FIG. 13 is a schematic diagram of an ink-jet recording apparatus.

FIG. 13 is a schematic diagram of an ink-jet recording apparatus (IJRA) which is another example of a device managed by the network management software. In FIG. 13, a carriage HC having a bin (not shown) is engaged with a helical groove 9003 of a lead screw 9004 which is rotated by a driving motor 9011 via transmission gears 9010 and 9008 such that the carriage HC is moved in both directions denoted by arrows a and b, depending upon the direction of rotation of the driving motor 9011. An ink-jet cartridge IJC is mounted on the carriage. Reference numeral 9001 denotes a paper pressing plate, for pressing paper against a platen 9000 along a direction in which the carriage HC moves. Reference numerals 9006 and 9007 are photocouplers serving as home-position detecting means for detecting whether the carriage HC is at the home position, by sensing a lever 9005 of the carriage such that the direction of rotation of the motor 9011 is switched in response to such detection. Reference numeral 9013 denotes a member for supporting a cap member 9019 for capping the front surface of a recording head. Reference numeral 9012 denotes sucking means for sucking the inside of the cap via an opening 9020 of the cap to recover the recording head. Reference numeral 9014 denotes a cleaning blade. Reference numeral 9016 denotes a member for moving the blade 9014 back and force. The members 9014 and 9016 are supported by a supporting plate 9015. Of course, another type of cleaning blade may also be used instead of the blade employed herein. Reference numeral 9018 denotes a lever used to start sucking to recover the recording head. The lever 9018 moves as a cam 9017 engaged with the carriage moves, wherein the movement is controlled by known means such as a clutch for transmitting a driving force from the driving motor. The capping, the cleaning, and the recovering by means of sucking are performed when the carriage comes to its home position, by means of functions of the lead screw 9004. Any other techniques may also be employed as long as such operation can be properly performed. The present invention may be applied to a system including devices such as a copying machine, a printer, and a scanner and may also be applied to a single device (such as a copying machine or a facsimile machine).

Program Code

Figure 15:
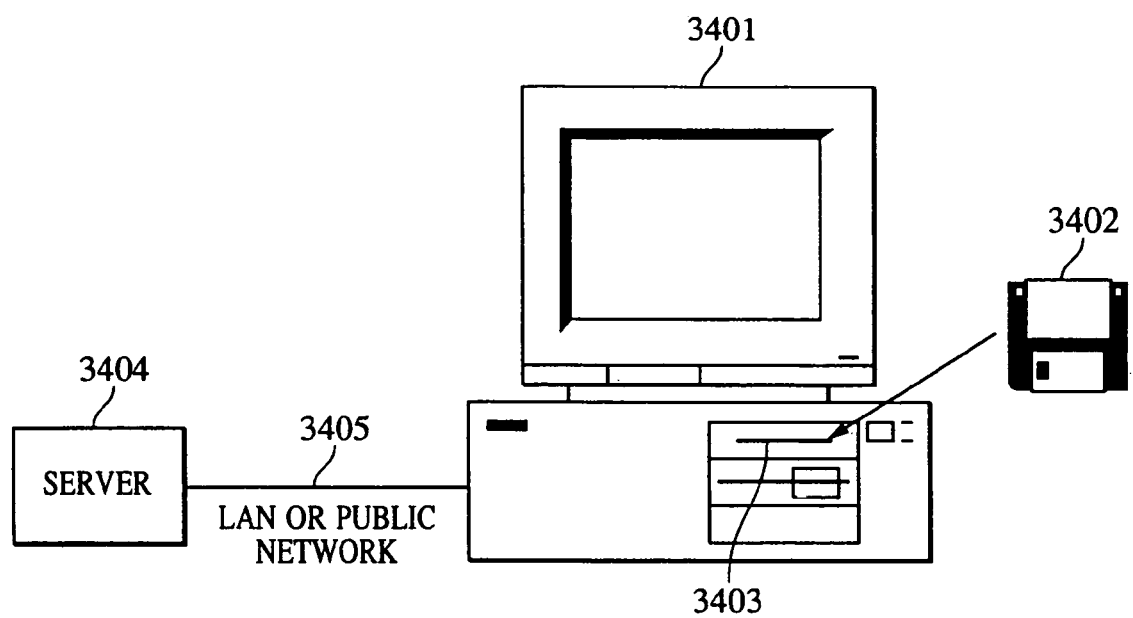
FIG. 15 is a diagram illustrating a manner of supplying a program code.

The objects of the present invention may also be achieved by supplying a storage medium (FIG. 14), on which a program code implementing the functions of any of the embodiments described above is stored, to a system such as that shown in FIG. 15, whereby a computer (CPU 501) in the system reads and executes the program code stored on the storage medium.

Another known method of supplying program code or data is to store the program code or data on a floppy disk FD 3402 and supply the floppy disk 3402 in a main unit 3401 of a PC as shown in FIG. 15. In this case, it should be understood that the program code read from the storage medium implements the functions of the invention, and thus the storage medium storing the program code falls within the scope of the present invention.

In addition to the floppy disk and the hard disk, other types of storage media, such as an optical disk, a magneto-optical disk, a CD-ROM, a CD-R, a magnetic tape, a nonvolatile memory card, and ROM, may also be used to supply the program code.

Another known method of supplying program code or data is to supply the program code or data from a server device to the main unit 3401 of the PC via a LAN or a public network 3405, as shown in FIG. 15. In this case, it should be understood that the program code implements the functions of the invention, and thus the server which supplies the program code falls within the scope of the present invention.

Furthermore, the scope of the present invention includes not only such a system in which the functions of any embodiment described above are implemented simply by reading and executing program code on a computer but also a system in which a part of or the whole of the processing instructed by the program code is performed using an OS (operating system) on the computer. Furthermore, the scope of the present invention also includes a system in which program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

In the network management technique using a WWW system, according to the present invention, as described above, users other than an administrator cannot change the setting (such as a network address) of network devices.

However, when the administrator of a network device forgets the device password assigned to the network device under management, the administrator can invalidate the device password via the WWW server. After invalidation of the password, the administrator can perform a process which needs administrator authorization, using the network device.

When the administrator of the device forgets the device password assigned to the network device under management, the administrator can also issue a command to ignore the device password via the WWW server. After issuing the command to ignore the password, the administrator can perform a process which needs administrator authorization, using the network device.

The implementation of all of the elements and steps described above is within the ordinary level of skill in the relevant technical field, using components and techniques that are commercially available and/or well known to those in the art.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A network management device connected to an information processing device and a network device via a network, for managing the network device in response to a request from the information processing device, said network management device comprising:

at least a processor and memory, cooperating to execute a method, the method comprising:

a process execution request receiving step of receiving, from the information processing device, a request for execution of a process upon the network device, where the execution of the process needs a permission provided when authentication information is verified;

a determining step of determining whether a command to ignore the authentication information has been received; and an execution step of, when said determining unit has determined that the command has been received, ignoring the authentication information of the network device and executing the process which needs the permission.

2. A network management device according to claim 1, wherein said execution step includes making an SNMP agent running on the network device perform the process which needs the permission, using an SNMP protocol.

3. A network management device according to claim 1, the method further comprising an input request transmitting step of, when it has been determined in said determining step that the command has not been received, transmitting to the information processing device a request to input the authentication information.

4. A network management device according to claim 3, the method further comprising a judging step of judging whether the authentication information transmitted in response to the input request and the authentication information are consistent with each other.

5. A network management device according to claim 1, wherein said process execution request receiving step includes receiving the process execution request from a WWW browser operating on the information processing device, via a WWW server operating in the network management device.

6. A network management device according to claim 1, wherein the network device is a printer or a network board.

7. A network management device according to claim 1, wherein the method further comprises an information transmitting step of transmitting information to the information processing device to display a screen on a display of the information processing device so that a command to perform a process which needs the permission can be input via the screen.

8. A non-transitory computer-readable storage medium storing, in executable form, a program for causing a computer to execute a method for communicating with an information processing device and a network device via a network and manage the network device in response to a request from the information processing device, said method comprising:

a process execution request receiving step, of receiving, from the information processing device, a request for execution of a process upon the network device, where the execution of the process needs a permission provided when authentication information is verified;

a determining step, of determining whether a command to ignore the authentication information has been received; and an execution step, in which, when it has been determined in said determining step that the command has been received, the authentication information of the network device is ignored and the process which needs the permission is executed.

9. A network management method for communicating with an information processing device and a network device via a network and managing the network device in response to a request from the information processing device, said method comprising:

a process execution request receiving step, of receiving, from the information processing device, a request for execution of a process upon the network device, where the execution of the process needs a permission provided when authentication information is verified;

a determining step, of determining whether a command to ignore the authentication information has been received; and an execution step, in which, when it has been determined in said determining step that the command has been received, the authentication information of the network device is ignored and the process which needs the permission is executed, wherein at least some of said steps are performed using a computer.

10. A network management device configured to communicate with an information processing device and a network device via a network, for managing the network device in response to a request from the information processing device, said network management device comprising:

at least a processor and memory, cooperating to execute a method, the method comprising:

a process execution request receiving step of receiving, from the information processing device, a request for execution of a process upon the network device, where the execution of the process needs a permission provided when authentication information is verified;

a determining step of determining whether a command to invalidate the authentication information has been received; and an invalidation request transmission step of, when said determining unit has determined that the command has been received, transmitting to the network device an invalidation request to invalidate the authentication information.

11. A network management method for a network management device configured to communicate with an information processing device and a network device via a network, for managing the network device in response to a request from the information processing device, said method comprising:

a process execution request receiving step of receiving, from the information processing device, a request for execution of a process upon the network device, where the execution of the process needs a permission provided when authentication information is verified;

a determining step of determining whether a command to invalidate the authentication information has been received; and an invalidation request transmission step, in which, when it has been determined in said determining step that the command has been received, an invalidation request to invalidate the authentication information is transmitted to the network device, wherein at least some of said steps are performed using a computer.

12. A non-transitory computer-readable storage medium storing, in executable form, a program for causing a computer to perform a network management method for a network management device configured to communicate with an information processing device and a network device via a network, for managing the network device in response to a request from the information processing device, said method comprising:

a process execution request receiving step of receiving, from the information processing device, a request for execution of a process upon the network device, where the execution of the process needs a permission provided when authentication information is verified;

a determining step of determining whether a command to invalidate the authentication information has been received; and an invalidation request transmission step, in which, when it has been determined in said determining step that the command has been received, an invalidation request to invalidate the authentication information is transmitted to the network device.

13. A network management device connected to an information processing device and a network device via a network, for managing the network device in response to a request from the information processing device, said network management device comprising:

at least a processor and memory, cooperating to execute a method, the method comprising:

a process execution request receiving step of receiving, from the information processing device, a request for execution of a process upon the network device, where execution of the process needs a permission provided when authentication information is verified;

a determining step of determining whether a command to ignore the authentication information has been received; and an execution step of, when said determining unit has determined that the command has been received, ignoring the authentication information and executes the process which needs the permission.

14. A network management method for a network management device connected to an information processing device and a network device via a network, for managing the network device in response to a request from the information processing device, said method comprising:

a process execution request receiving step of receiving, from the information processing device, a request for execution of a process upon the network device, where execution of the process needs a permission provided when authentication information is verified;

a determining step of determining whether a command to ignore the authentication information has been received; and an execution step, in which, when it has been determined in said step that the command has been received, the authentication information is ignored and the process which needs the permission is executed, wherein at least some of said steps are performed using a computer.

15. A non-transitory computer-readable storage medium storing, in executable form, a program for causing a computer to perform a network management method for a network management device connected to an information processing device and a network device via a network, for managing the network device in response to a request from the information processing device, said method comprising:

a process execution request receiving step of receiving, from the information processing device, a request for execution of a process upon the network device, where execution of the process needs a permission provided when authentication information is verified;

a determining step of determining whether a command to ignore the authentication information has been received; and an execution step, in which, when it has been determined in said determining step that the command has been received, the authentication information is ignored and the process which needs the permission is executed.

* * * * *